United States Patent [19]

Hoppmann

[11] 3,900,107

[45] Aug. 19, 1975

[54] ROTATING METHOD OF SORTING PARTICULATE ARTICLES

[75] Inventor: Kurt H. Hoppmann, Falls Church, Va.

[73] Assignee: Hoppmann Corporation, Springfield, Va.

[22] Filed: Feb. 7, 1974

[21] Appl. No.: 440,408

[52] U.S. Cl. .................. 209/73; 198/25; 221/159
[51] Int. Cl.² .... B23Q 7/02; B23Q 7/12; B65H 9/16
[58] Field of Search .................. 209/73, 83, 86; 198/256–260, 264–265, 279, 283, 284, 25; 221/7, 167–170, 159–162; 133/3 R, 3 A

[56] References Cited
UNITED STATES PATENTS

| | | | |
|---|---|---|---|
| 1,876,847 | 9/1932 | Brubaker | 198/284 |
| 2,532,760 | 12/1950 | Davies | 221/170 X |
| 3,007,565 | 11/1961 | Yoshikawa | 221/169 X |
| 3,669,260 | 6/1972 | Hoppmann | 209/73 |

*Primary Examiner*—Robert B. Reeves
*Assistant Examiner*—Thomas E. Kocovsky
*Attorney, Agent, or Firm*—David H. Semmes

[57] ABSTRACT

High speed feeding, counting, orienting and storing of small parts such as ammunition, candy, machine screws, nuts and the like. The articles are radially distributed while being accelerataed upon a rotating inner plane, then discharged upon an inclined, moving surface ramp at the periphery of the rotating inner plane so as to move the articles upwardly; at the top of the ramp the articles are centrifugally carried away upon a rotating outer rim. Tangential discharge of the articles from the rim may be gauged so as to discharge articles only of a given configuration or orientation. Modifications of the invention include supporting of the ramp so that it has two or more inclined surfaces intersecting with the rotating outer plane, so as to increase the speed of handling; varying the inclination of the ramp and varying the speeds of rotation of inner and outer rims, as well as the moving surface of the ramp.

20 Claims, 11 Drawing Figures

ROTATING METHOD OF SORTING PARTICULATE ARTICLES

CROSS REFERENCES TO RELATED APPLICATIONS

An improvement upon applicant's earlier filed application entitled CENTRIFUGAL METHOD OF SORTING PARTICULATE ARTICLES (Ser. No. 334,696) filed Mar. 26, 1973 issued as U.S. Pat. No. 3,831,734. The present application is distinguished by its utilization of a moving surface ramp which enables a precise control over the speed of delivery of the articles to the outer rotating rim where they are centrifugally distributed.

BACKGROUND OF THE INVENTION

1. Field of the Invention

Increasing attention is being given to methods for high speed orientation of nails, pills, machine screws, nuts, small arms munitions and the like. Recent inventors have evolved a plurality of rotating devices which centrifugally discharge articles to be counted from the edges of a rotating plane. Traditionally these centrifugally distributed articles are forced through a separate stationary exit aperture and then counted in a separate orienting and counting mechanism.

The separate orienting and counting is time consuming, subject to jamming and breakdown and economically discouraging due to greater capital cost and space required for opertion.

2. Description of the Prior Art

| | |
|---|---|
| HOAR | 2,632,588 |
| GARRETT | 2,763,108 |
| d'AUTHEVILLE | 3,063,596 |
| PEARSON | 3,170,627 |
| HURST | 3,215,310 |
| READ | 3,253,604 |
| PEARSON | 3,266,664 |
| HURST | 3,368,713 |
| HOPPMANN, et al | 3,669,260 |
| HOPPMANN, et al | 3,722,674 |

SUMMARY OF THE INVENTION

According to the present invention, the articles to be handled are radially distributed upon a rotating inner plane then the articles are conveyed upwardly from the rotating inner plane by means of a moving surface ramp which intersects a plane of a rotating outer rim. The articles are then centrifugally carried away from the top of the ramp upon the rotating outer rim and tangentially gauged at the rim. Modifications of invention include providing the moving surface of the ramp with two or more inclines which intersect the plane of rotating outer rim; varying the speeds of moving of the ramp, the incline of the ramp, and varying as well the speeds of rotation of the inner and outer rims.

BRIEF DESCRIPTION OF THE DRAWINGS

In FIG. 1 a suggested apparatus is illustrated as including a rotating inner plane 10 mounted upon a suitable chassis 18, a stationary ramp 12. A rotating outer rim 16 intersects the top of the moving surface 14, such that peripherally aligned shells 24 are carried across the surface of rotating outer rim 16 for tangential discharge as at 25. Vertical baffle 28 insures that the parts exit tangentially. Furthermore, by adjusting vertical baffle 28, the width of rim 16 may be set so that only one part at a time will pass. Excess parts fall off the rim back onto the rotating inner plane and are again radially distributed. The effect is to yield a stream of singulated parts at 25.

In FIG. 2 this similar arrangement is illustrated wherein capsules or pills 32 are radially distributed, moved upward upon the ramp surface and centrifugally carried across the rotating outer rim. One or more capsules 34 are shown in an attitude of falling off the rotating outer rim. Manifestly, the rim surface may be constricted to the equivalent diameter of the articles being distributed so as to support only capsules, shells, pills or the like in aligned relationship. Those non-aligned articles which fell off of the rim, are then radially distributed again upon the rotating inner plane.

Figure 1:
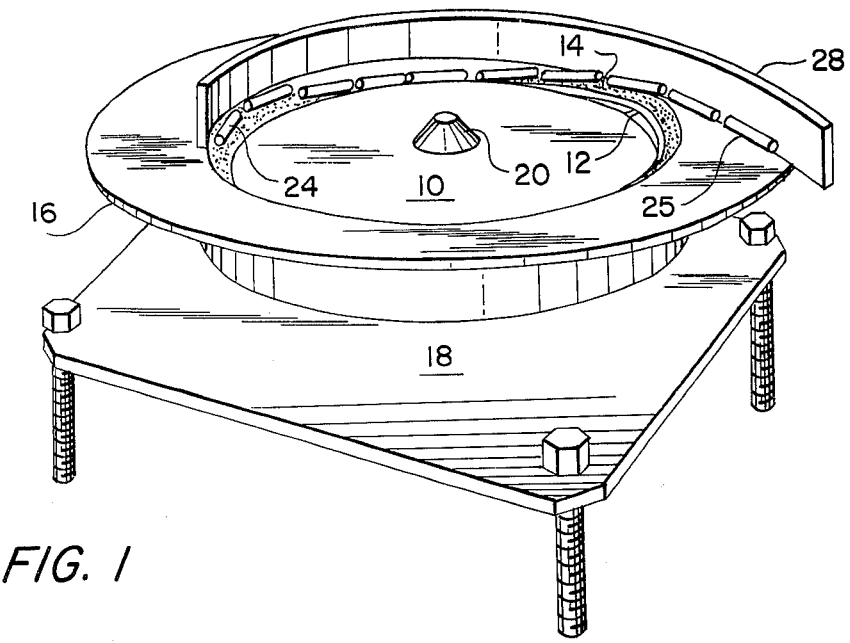
FIG. 1 is a perspective view of a proposed apparatus, constructed according to the present method, and showing the aligned upward movement of accelerating shells upon the moving surface and across the rotating outer rim where they are discharged.
Figure 2:
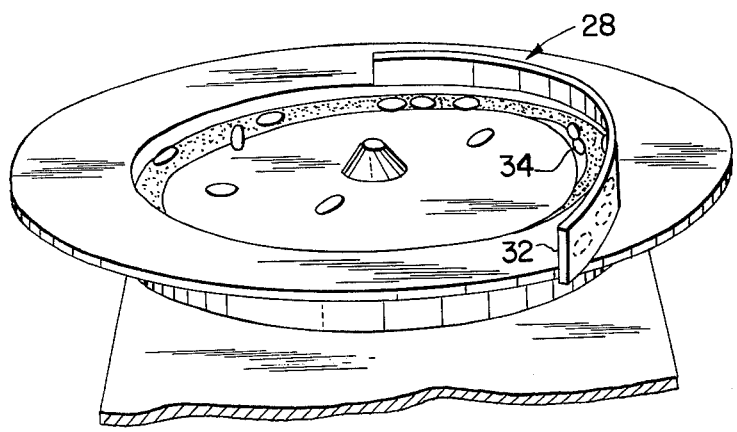
FIG. 2 is a perspective showing similar aligned movement and discharge of capsules from the moving surface ramp across the rotating outer rim.
Figure 5:
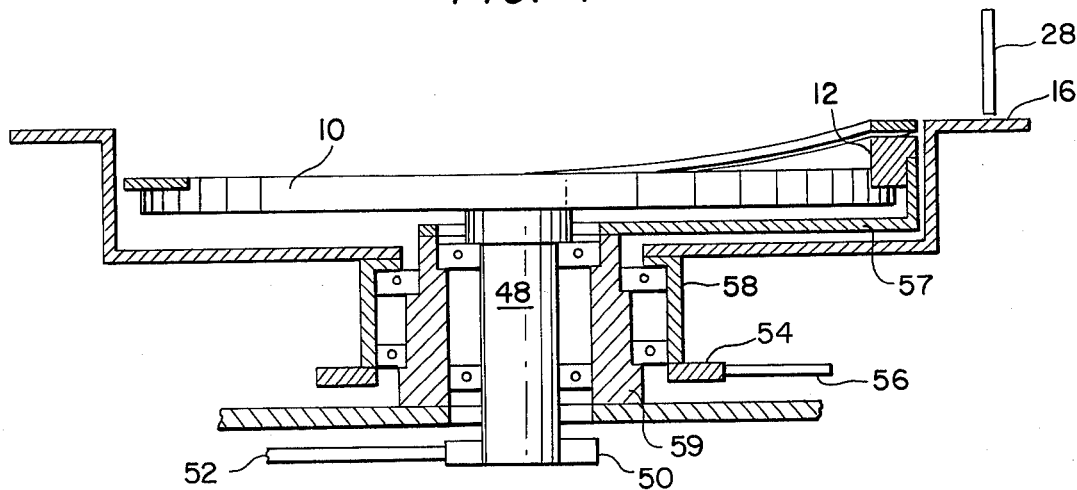
FIG. 5 is a cross-section of the FIG. 1 apparatus.

The apparatus illustrated in FIGS. 1 and 2 is shown in cross-section in FIG. 5 including central shaft 48 which may drive the rotating inner plane 10 with a suitable pulley 50 and drive belt or the like 52. The rotating outer rim 16 is supported on bearing housing 58 and driven with a suitable pulley 54 and drive belt or the like 56. The stationary ramp 12 is supported on rotating inner plane 10 and prevented from turning by arm 57 which is fastened to stationary bearing housing 59.

Figure 3:
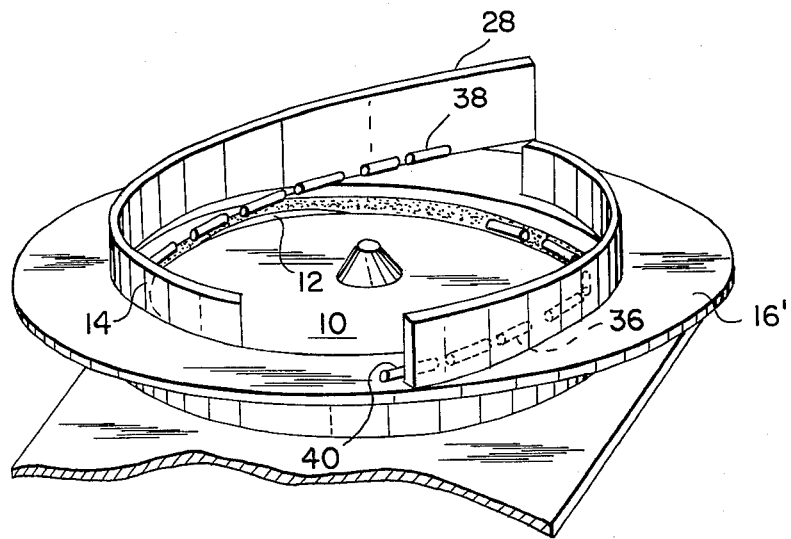
FIG. 3 is a perspective showing a modification of invention when the moving surface ramp has two inclined surfaces intersecting with the rotating outer rim, thus enabling two tangential ejections of shells from the rotating outer rim.

In FIG. 3 a modified apparatus is illustrated wherein the moving ramp includes two inclined components 12 such that the aligned shells are discharged in two lines 38 and 40 across the moving surface ramp. The second ramp surface intersects the rotating outer rim as at 36.

Figure 4:
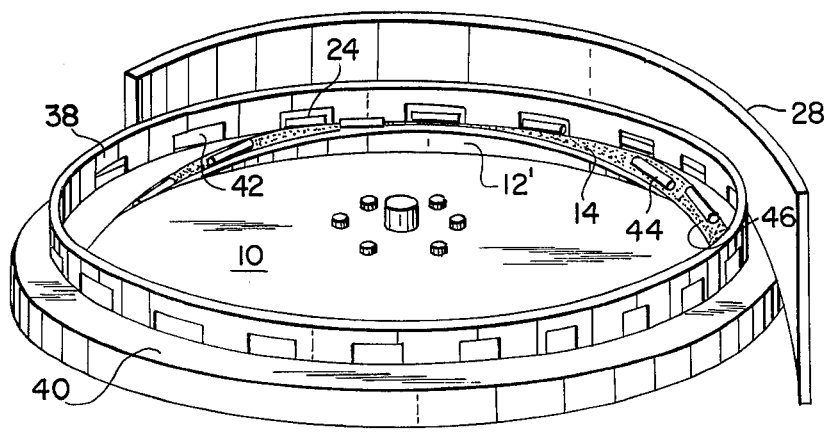
FIG. 4 is a perspective of further modification wherein discharge of aligned shells from the top ramp is gauged by an apertured gate.
Figure 6:
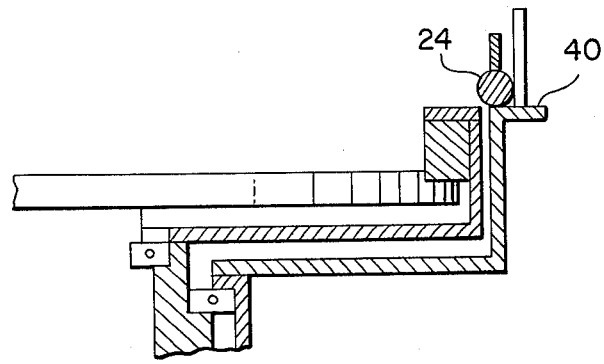
FIG. 6 is a cross-section of the FIG. 4 apparatus.
Figure 7:
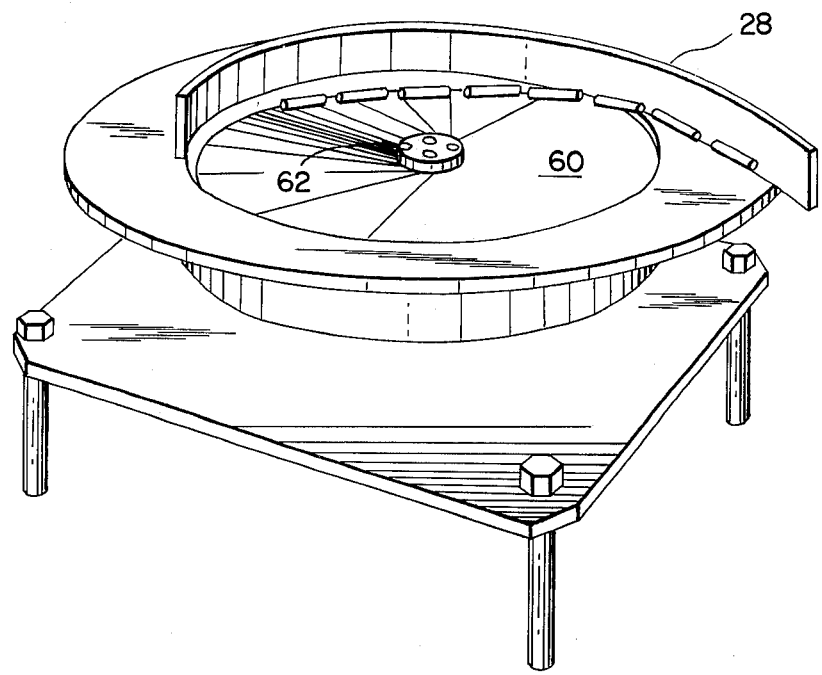
FIG. 7 is a perspective of an apparatus wherein the ramp and inner rotating rim surface are integral.

In FIG. 4 a further modification is illustrated wherein the rotating outer rim has a vertical baffle 38 having aperture 42 which gauge the discharge of shells 24 onto the rotating outer plane 40. If the ramp surface 14 moves at a slightly higher speed than the vertical baffle 38, then each part will be carried to a second aperture 42 if it does not enter the first aperture it passes. Since an excess of parts is carried up the ramp, the fill rate of the apertures will be quite high. The excess parts, 44 and 46, will be carried back down the ramp for further radial distribution. Stationary vertical baffle 28 will insure that only one part will enter each aperture. From this position the parts either can be released tangentially at predetermined spaced intervals or they can be passed into radial orienting chutes as described in U.S. Pat. Application Ser. No. 344,696. This arrangement is further illustrated in FIG. 6.

As will be apparent, the present method results in higher output rate, provided that a single stream of articles is required. In applicant's prior methods the articles being oriented were transferred from the lower level via a ramp to an elevated gauging rim, being affected by frictional forces of the stationary ramp surface, as well as gravitational forces. These forces required that the oriented parts be accelerated at the lower level in order to arrive with adequate velocity at the top of the ramp. Thus the articles were required to be accelerated to a higher velocity in the lower plane than was required for exit at the periphery of the gauging ring. Although high rates of output could be obtained, much higher rates are now possible because the speed of the part as it passes the aperture can now be controlled to obtain the optimum aperture entry speed.

According to the present method both the frictional and gravitational forces are overcome such that a higher output rate is obtained.

The ramp moving surface may rest upon the periphery of the rotating inner plane except at its inclined portion such that a plurality of inclines may be provided.

The use of two or more inclines, as illustrated in FIG. 3 greatly increases the output rate. Also, a third inclined ramp may be provided to increase output and insure delivery of the articles into unfilled apertures of the gauging ring.

Figure 8:
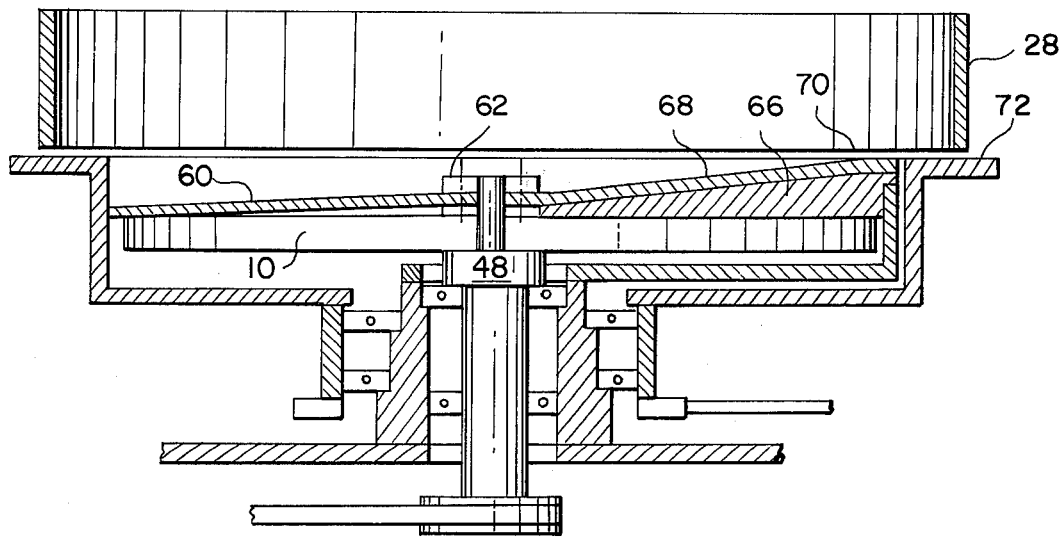
FIG. 8 is a cross-section of the FIG. 7 apparatus.

According to the modification shown in FIG. 8, the rotating inner plane 10 is supported upon a suitably driven shaft 48. The moving surface 60 of the rotating inner plane is integral with the inclined ramp surface 68 moving upon stationary ramp 66 and terminating in a level plane 70 coincident with the plane of the rotating outer rim 72. Ramp 66 may be supported on an arcuate segment intersecting the periphery of rotating plane 10.

Figure 9A:
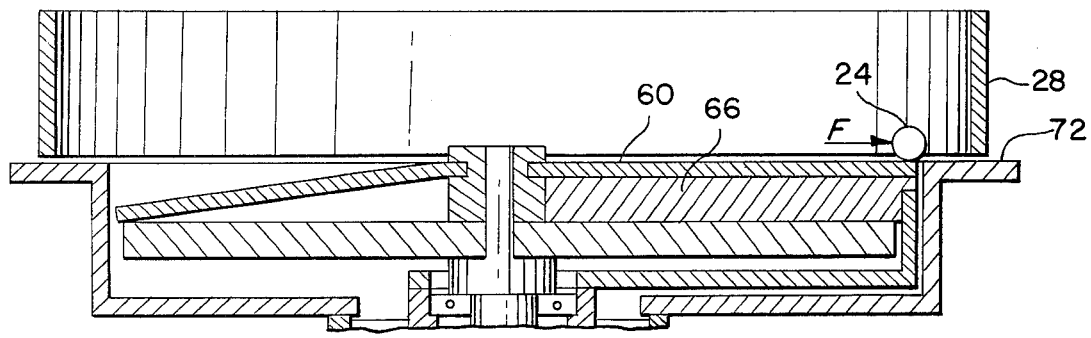
FIGS. 9A-9C are vertical sections of various configurations of the moving surface ramp shown in FIG. 8.
Figure 9B:
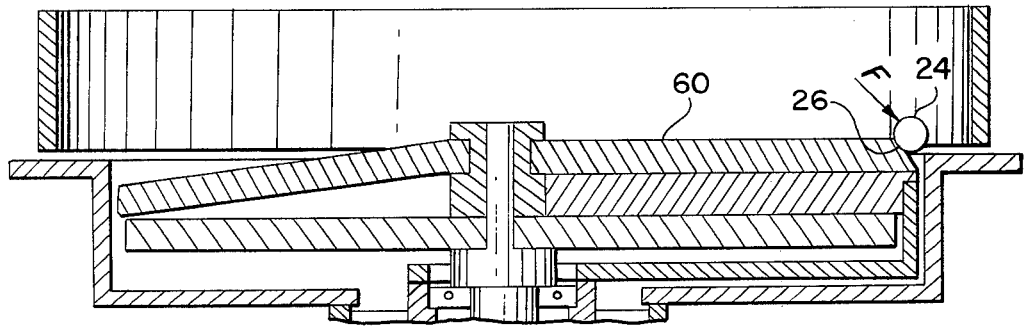
Figure 9C:
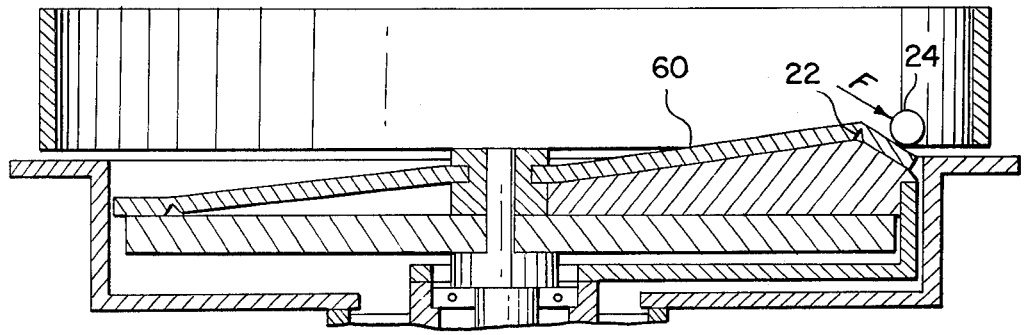

FIGS. 9A through 9C show different configurations of modified moving surface ramp 60. These configurations are useful in transferring particles 24 from the moving surface ramp 60 to the rotating outer rim 72 when the moving surface ramp is rotating slowly.

In FIG. 9A, the thickness of the inner portion of the stationary ramp 66 has been increased so that the plane of the moving surface ramp 60 is horizontal or sloped down towards the plane of the rotating outer rim 72. This allows the moving surface 60 to be relatively thick while maintaining the proper attitude for discharge of the parts.

In FIG. 9B, the outer edge of the moving surface 60 has been chamfered at 26 to provide a positive gravitational discharge angle for the particle 24.

In FIG. 9C, the under side of the moving surface 60 has been grooved as at 22 to provide flexibility. This flexibility will permit the moving surface to provide a positive discharge angle as shown even though the surface is relatively thick.

The moving surface 60 may be clamped to the driven shaft 48 by plate 62 insuring that the surface moves with the rotating inner plane 10. The moving surface 60 may also be simply guided by the driven shaft 48 and carried along by friction between the flexible surface 60 and the rotating inner plane 10.

Manifestly, variations in fitting of the moving ramp surface and supporting of the incline, as well as gauging of the articles may be employed without departing from the spirit of the invention.

I claim:

1. Rotating method of sorting particulate articles comprising:
   A. radially distributing while accelerating said articles upon a rotating inner plane;
   B. elevating said articles upon an inclined moving surface ramp rotating peripherally of said rotating inner plane, and
   C. centrifugally carrying said articles away from the top of said ramp upon a rotating outer rim.

2. Rotating method of sorting particulate articles as in claim 1, wherein said moving surface of said ramp and said rotating surface of said inner plane are integral.

3. Rotating method of sorting particulate articles as in claim 1, wherein said inner plane and said rim rotate at the same speed.

4. Rotating method of sorting particulate articles as in claim 1, wherein said inner plane and said rim rotate at independent speeds.

5. Rotating method of sorting particulate articles as in claim 1, wherein said moving surface rotates in the same direction as said rotating outer rim.

6. Rotating method of sorting particulate articles as in claim 1, including varying the vertical profile of said rotating inner plane, such that said articles are radially distributed gravitationally to the periphery thereof.

7. Rotating method of sorting particulate articles as in claim 1, wherein said accelerating of articles is such as to distribute centrifugally said articles upon said rotating inner plane.

8. Rotating method of sorting particulate articles as in claim 1, wherein said radial distributing of said articles is by a mechanical element.

9. Rotating method of sorting marticulate articles as in claim 1, wherein said moving surface of said ramp is rotated by frictional forces.

10. Rotating method of sorting particulate articles as in claim 1, wherein said moving surface of said ramp is rotated by mechanical connection to said moving surface.

11. Rotating method of sorting particulate articles as in claim 1, wherein said moving surface of said ramp is separate from said inner plane.

12. Rotating method of sorting particulate articles as in claim 11, wherein said inner plane, said moving surface of said ramp, and said rim rotate at the same speed.

13. Rotating method of sorting particulate articles as in claim 11, wherein said inner plane, said moving surface of said ramp, and said rim, all rotate at independent speeds.

14. Rotating method of sorting particulate articles as in claim 11, including constricting the width of said ramp to the diameter of articles being sorted.

15. Rotating method of sorting particulate articles comprising:
   A. radially distributing while accelerating said articles upon a rotating inner plane;
   B. elevating said articles upon an inclined moving surface ramp rotating peripherally of said rotating inner plane;

C. centrifugally carring said articles away from the top of said ramp upon a rotating outer rim; and D. gauging discharge of said articles from said rim.

16. Rotating method of sorting particulate articles as in claim 15, wherein said discharge is tangential.

17. Rotating method of sorting particulate articles as in claim 15, wherein said discharge is radial.

18. Rotating method of sorting particulate articles as in claim 15, including varying the incline of said ramp.

19. Rotating method of sorting particulate articles as in claim 15, including varying the incline turn of said ramp so as to control speed of moving of said articles upwardly.

20. Rotating method of sorting particulate articles as in claim 15, including recovering of articles falling off of said rim into said inner plane and radially redistributing said articles to said moving surface of said ramp.

* * * * *